US 6,710,304 B2

(12) United States Patent  
Yokoo

(10) Patent No.: US 6,710,304 B2  
(45) Date of Patent: Mar. 23, 2004

(54) CARTRIDGE TYPE SOLDERING IRON WITH A RELEASABLE AND REPLACEABLE HANDLE

(75) Inventor: Bungo Yokoo, Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 09/977,855

(22) Filed: Oct. 11, 2001

(65) Prior Publication Data

US 2002/0158107 A1 Oct. 31, 2002

Related U.S. Application Data

(63) Continuation-in-part of application No. 09/842,992, filed on Apr. 26, 2001.

(51) Int. Cl.$^7$ .............................. H05B 3/42; B23K 3/08
(52) U.S. Cl. ..................... 219/229; 219/230; 228/51; 228/55
(58) Field of Search ............... 228/51–55, 56.5; 219/229, 230

(56) References Cited

U.S. PATENT DOCUMENTS

| 1,520,597 | A |   | 12/1924 | Reavis |         |
|-----------|---|---|---------|--------|---------|
| 1,706,740 | A |   | 3/1929  | Powell |         |
| 3,032,637 | A |   | 5/1962  | Wesserlein |     |
| 3,558,854 | A |   | 1/1971  | Siegel et al. |  |
| 3,770,183 | A |   | 11/1973 | Vanyi |          |
| 3,883,716 | A | * | 5/1975  | Fortune | 219/239 |
| 3,905,755 | A | * | 9/1975  | Aske | 222/5 |
| 4,074,110 | A |   | 2/1978  | Slaughter |      |
| 4,459,463 | A |   | 7/1984  | Knowles |        |
| 4,700,031 | A | * | 10/1987 | Claghorn et al. | 200/281 |
| 4,734,559 | A |   | 3/1988  | Fortune et al. | |
| 4,773,582 | A | * | 9/1988  | Vella | 219/230 |
| 4,839,501 | A | * | 6/1989  | Cowell | 219/229 |
| 5,048,742 | A |   | 9/1991  | Fortune | |
| 5,059,769 | A |   | 10/1991 | Fortune | |
| 5,094,384 | A | * | 3/1992  | Urban | 228/165 |
| 5,329,085 | A | * | 7/1994  | Cowell et al. | 219/229 |
| 5,422,457 | A |   | 6/1995  | Tang et al. | |
| 5,524,809 | A | * | 6/1996  | Kosslow et al. | 219/230 |
| 5,542,600 | A | * | 8/1996  | Kobayashi et al. | 228/102 |
| 5,804,795 | A |   | 9/1998  | Fortune | |
| 5,843,197 | A | * | 12/1998 | Rossnagel | 55/385.2 |
| 5,944,508 | A | * | 8/1999  | Bonnema | 126/408 |
| 5,945,015 | A | * | 8/1999  | Feinler | 219/229 |
| 6,040,559 | A |   | 3/2000  | Chou | |
| 6,215,104 | B1 | * | 4/2001 | Kurpiela et al. | 219/230 |

FOREIGN PATENT DOCUMENTS

| DE | 3929585 A1 | * | 3/1991 |
| JP | 53-118254 A | * | 10/1978 |
| JP | 2002118358 |   | 4/2002 |

* cited by examiner

Primary Examiner—L. Edmondson  
(74) Attorney, Agent, or Firm—Squire, Sanders & Dempsey, L.L.P.

(57) ABSTRACT

The present invention allows a user to select a handle that is ergonomically friendly to a user's hand and replace it with the replaceable handle that is designed to fit over a soldering iron rod. There are a number of advantages to the present invention. One of the advantages is that a user can choose an individual handle with the desired shape, size, color, and material. Another advantage is that since each user has an individual handle, hygiene problems may be minimized. Still another advantage is the cost savings because as the replaceable handle wears out, only the handle needs to be replaced rather than the whole soldering iron.

26 Claims, 5 Drawing Sheets

CARTRIDGE TYPE SOLDERING IRON WITH A RELEASABLE AND REPLACEABLE HANDLE

CROSS-REFERENCES TO RELATED APPLICATIONS

This application is a continuation-in-part application of U.S. application Ser. No. 09/842,992 filed Apr. 26, 2001, which is incorporated herein by reference.

BACKGROUND OF THE INVENTION

1. Field of the Invention

This invention relates generally to a soldering iron and, more particularly, to a soldering iron having a releasable and replaceable cartridge and associated handle that may be replaced with a customized handle for a particular user.

2. General Background and State of the Art

Cartridge type soldering irons have been in use for a number of years. One example of a cartridge type soldering iron is disclosed in U.S. Pat. No. 4,839,501. As disclosed therein, there is a replaceable cartridge and associated rigid handle. One of the problems with a soldering iron with a replaceable cartridge as shown in the U.S. Pat. No. 4,839,501 patent is that it is not comfortable for every user. That is, if a user does not like the size or shape of the handle of a soldering iron, the user has to either find another iron that is more comfortable or continue to use the uncomfortable soldering iron. Moreover, a soldering iron may be handled by a number of users, which can cause hygiene problems. This is especially true because most germs are transmitted via human hands.

Therefore, there is a need for a cartridge type soldering iron having a handle that can be fitted to a particular user and, at the same time, minimize any hygiene problems being caused by a number of users handling the same soldering iron.

INVENTION SUMMARY

The present invention solves the aforementioned problems with a cartridge type soldering iron by providing a handle that is releasable from the soldering iron cartridge and replaceable with a handle that is more comfortable to the user. This allows a user to select a handle that is ergonomically friendly to his hand and replace it with the replaceable handle that is design to fit the soldering iron cartridge. There are a number of advantages to the present invention. One of the advantages is that a user can choose its own handle with the desired, shape, size, color, and material. Another advantage is that since each user has its own handle, hygiene problems may be minimized. Still another advantage is the cost savings because as the replaceable handle wares out, only the handle needs to be replaced rather than the whole soldering iron.

The above described and many other features and attendant advantages of the present invention will become apparent from a consideration of the following detailed description when considered in conjunction with the accompanying drawings.

BRIEF DESCRIPTION OF THE DRAWINGS

A detailed description of exemplary embodiments according to the invention will be made with reference to the accompanying drawings.

DETAILED DESCRIPTION OF THE PREFERRED EMBODIMENTS

This description is not to be taken in a limiting sense, but is made merely for the purpose of illustrating the general principles of the invention. The section titles and overall organization of the present detailed description are for the purpose of convenience only and are not intended to limit the present invention.

Figure 1:
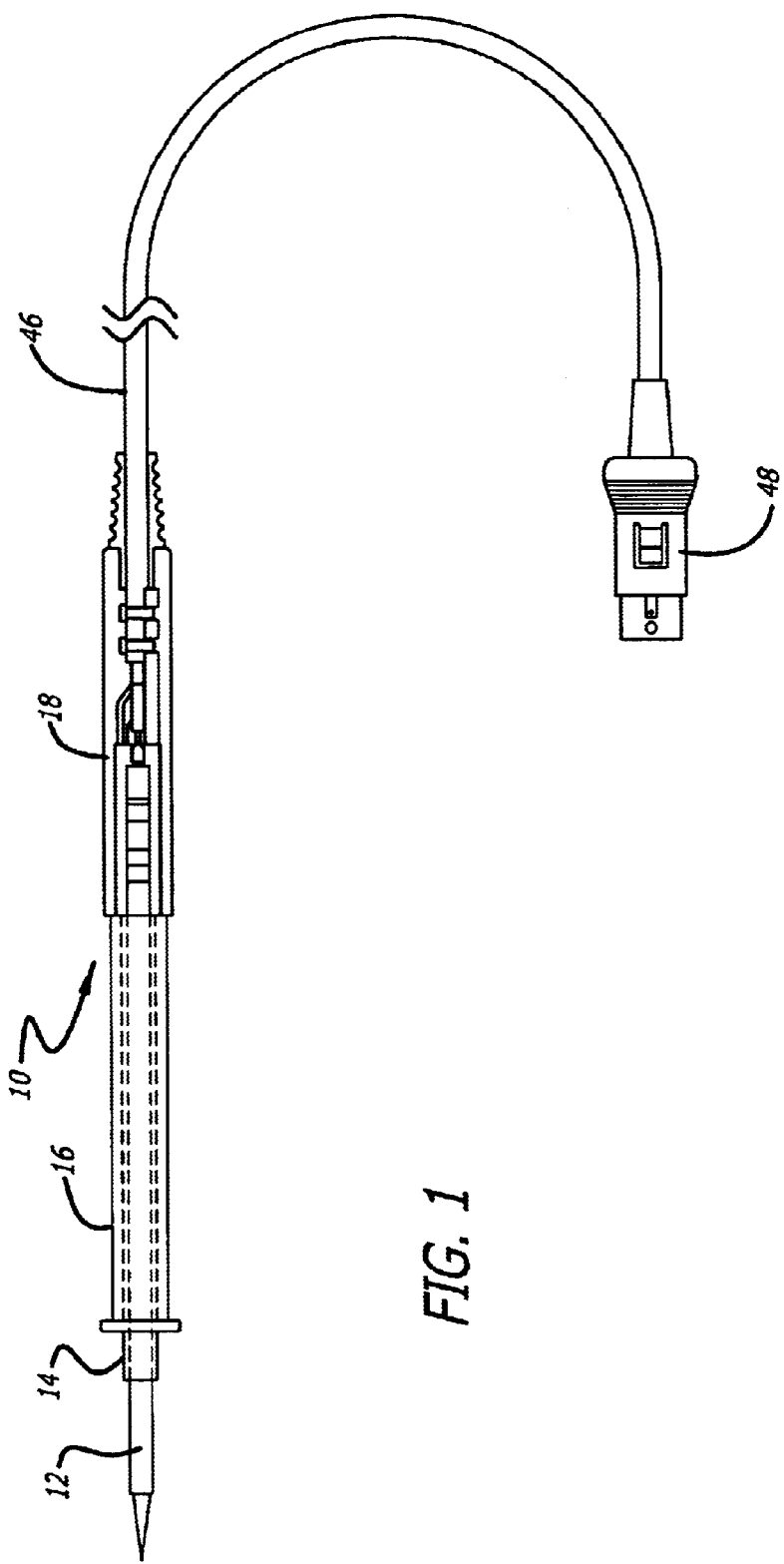
FIG. 1 is an exemplary view of an assembled soldering iron in accordance with one embodiment of the present invention.

FIG. 1 illustrates by way of example a soldering iron cartridge 10 (cartridge) having a sleeve 12 disposed within an insulator 14, which is also disposed within a releasable handle 16. This assembly is further adapted to electrically connect to a connector 18 having a cord extending to a plug 48.

Figure 2:
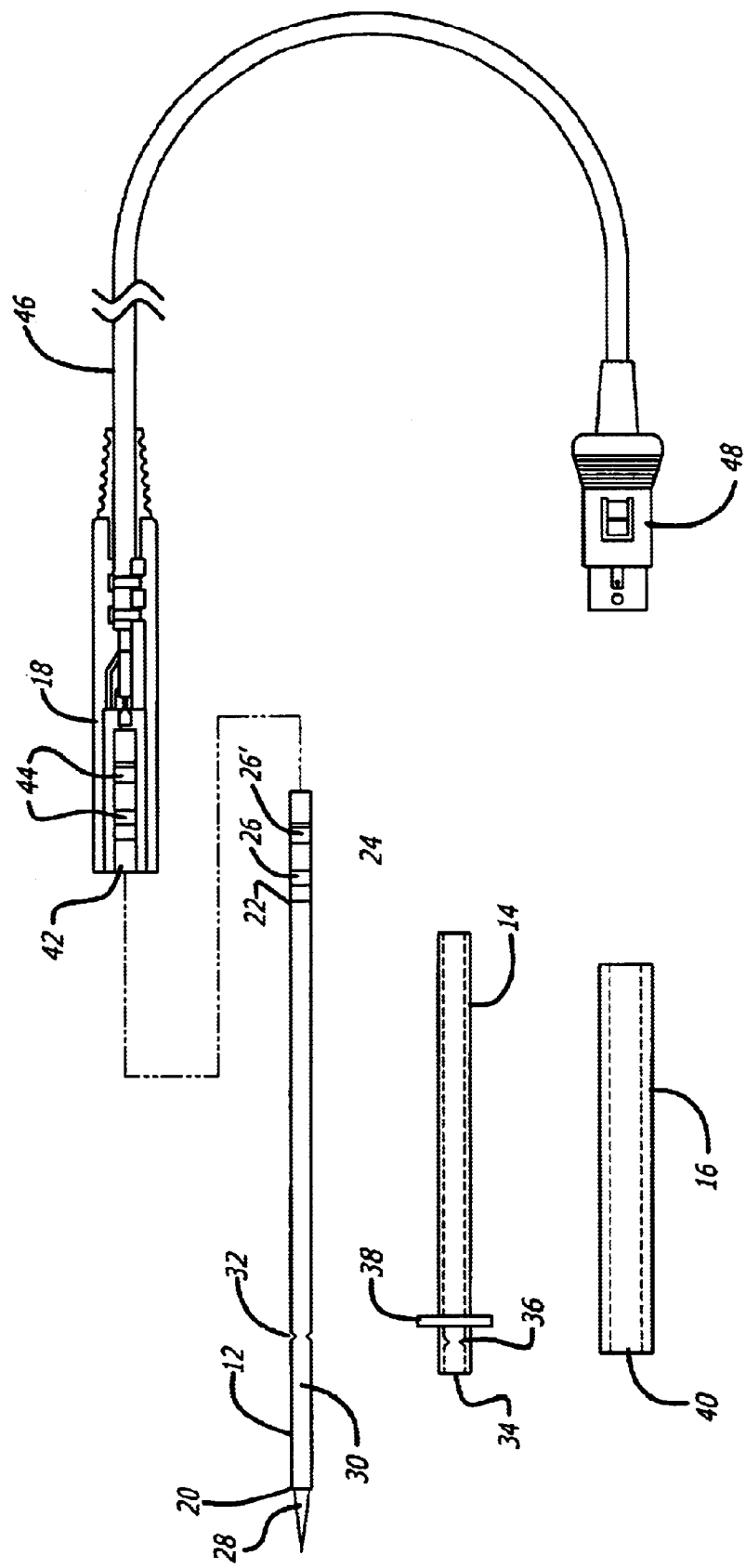
FIG. 2 is an exemplary view of a disassembled soldering iron of FIG. 1.

FIG. 2 illustrates by way of example the cartridge 10 disassembled. The sleeve 12 has a proximal end 22 and a distal end 20. The proximal end 22 is adapted to couple to a connector end 24 having electrical contact areas 26 and 26'. The distal end of the sleeve 12 is adapted to couple to a tip 28 which is designed to concentrate the heat generated by the electrical heating elements 30 within the sleeve 12 (not shown). That is, the electrical energy supplied to the electrical heat element 30 via the electrical contact areas 26 and 26' are converted into heat and focused along the tip 28. Optionally, the sleeve 12 may have a notch 32 along the surface of the sleeve 12 so that it may be used to position the insulator 14 at a predetermined position relative to the sleeve 12, as further discussed below.

As illustrated by way of example in FIG. 2, the insulator 14 has an opening 34 running axially therethrough. The shape of the opening 34 may be substantially similar to the outer configuration of the sleeve 12. Once the sleeve 12 is inserted through the opening 34, the cartridge 10 may be firmly held in place. Moreover, within the opening 34 may be a tooth 36 which is adapted to engage with the notch 32 thereby positioning the insulator 14 relative to the sleeve 12 in a predetermined position. Additionally, the sleeve 12 may be fixed or releasably held within the opening 34 of the insulator 14.

Optionally, the insulator 14 may have an outer ring 38 which is made of temperature-sensitive material. That is, as the sleeve 12 near the tip 28 gets hot, the outer ring 38 may indicate such a rise in temperature by varying its color, depending on the temperature of the sleeve. This way, a user may be warned that the soldering iron is hot. Moreover, the length of the insulator 14 may be sized so that it is less than the length of the sleeve between its proximal and distal ends.

FIG. 2 also illustrates an exemplary handle 16 having a hole therethrough along the longitudinal axis. The configuration of the hole 40 may be substantially similar to the outer configuration of insulator 14. Once the insulator 14 is inserted into the hole 40, it snugly fits into the hole 40 and it is removable. The outer circumference of the handle 16 may vary in size, shape, and may be made of a variety of materials with different degrees of firmness. This allows a particular user to pick a handle that is ergonomically comfortable to grip. Because each user may have his own handle 16, the hygiene problem is minimized. Cost-wise, when the handle 16 wears out, rather than replacing the whole soldering iron cartridge 10, just the handle 16 may be replaced. The handle 16 may be made of foam and may be carbon impregnated to allow static discharge. Moreover, the handle 16, may be washable. Of course, the handle 16 may be made of a variety of materials known to those skilled in the art including rubber, elastomers, and plastics.

FIG. 2 further illustrates by example the connector 18 having a receptacle opening 42 therein. Within the receptacle opening 32 are electrical contact fingers 44 positioned to make electrical contact with the electrical contact areas 26 and 26' of the connector end 24. That is, once the connector end 24 is inserted into the receptacle opening 42, electrical contact fingers 44 make electrical contact with the electrical contact areas 26 and 26'. Connector 18 also includes a cord 46 which is coupled to a plug 48 which is adapted to insert into an electrical outlet. Note that the length of the handle 16 is designed to fit flush against the outer ring 38 and fit flush against the opposite end. This way, once the connector end 24 is inserted into the receptacle opening 42, the connector, connector end, and the handle are flush against each other.

Figure 3:
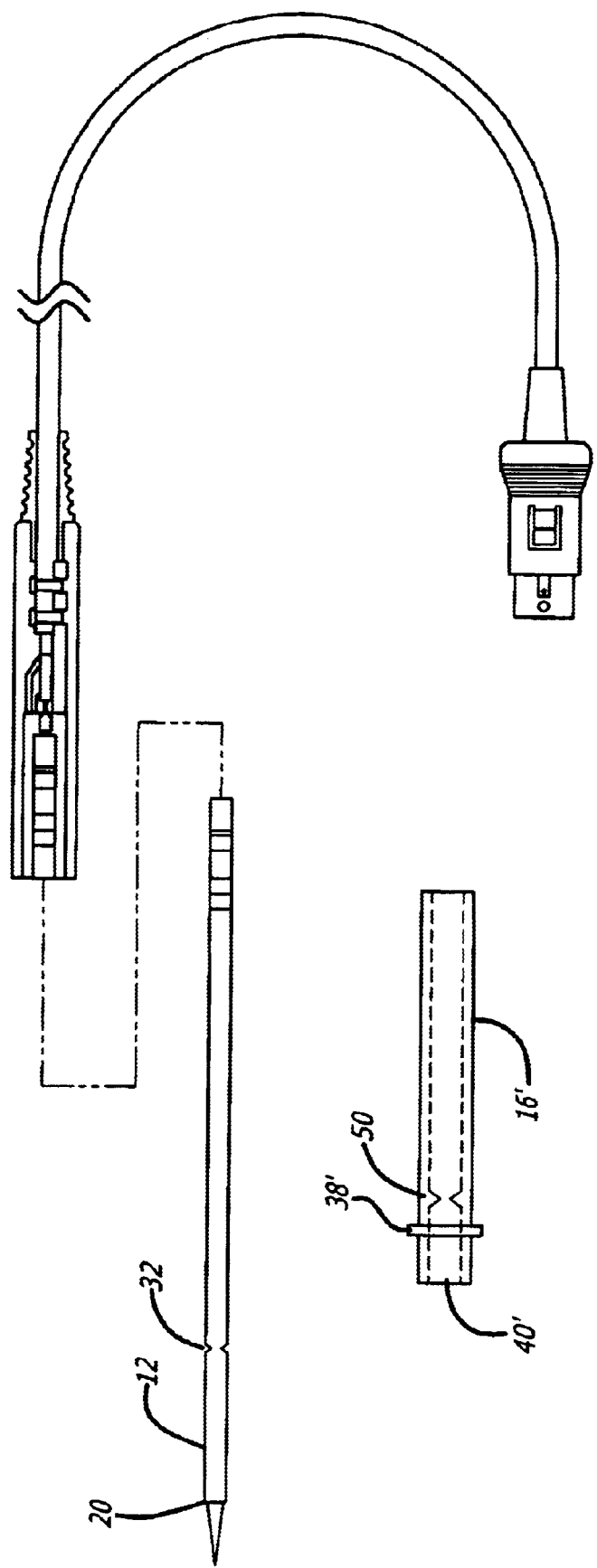
FIG. 3 is an exemplary view of a disassembled soldering iron in accordance with an alternative embodiment of the present invention.

FIG. 3 illustrates by example an alternative embodiment of the present invention wherein the sleeve 12 is inserted into a hole 40' of the handle 16'. In this embodiment, the insulator 14 is eliminated, unlike the previous embodiment in FIG. 2. The sleeve 12 may be releasable from the handle 16', and the handle 16' may have a tooth 50 adapted to associate with the notch 32 of the sleeve 12 to position the handle 16' relative to the sleeve 12 at a predetermined position. One of the reasons for not needing the insulator 14 is that much of the heat is focused near the distal end 20 and minimal heat is conducted back along the sleeve 12 to the location of the notch 32, so that a handle 16' made of foam would not degrade due to the heat. Of course, the hole 40' is now sized to be substantially similar in dimension to the configuration of the sleeve 12. Moreover, the handle 16' may have an outer ring 38' to indicate the temperature of the outer ring 38'.

With regard to the cross-section of the sleeve 12, it may have a variety of cross-sectional shapes such as circular, oval, square, or rectangular. The hole 40' however need not be similar to the cross-sectional area of the sleeve 12, although at least a portion of the hole 40' is used to engage the outer surface of the sleeve 12 to somewhat firmly hold the sleeve 12 in its predetermined position. As such, air passageways may be formed between the handle 16' and the sleeve 12 to radiate the heat away from the handle 16'. Of course, the cross-section of the hole 40' may correspond to the cross-section of the sleeve 12 to make continuous contact between the handle 16' and the surface of the sleeve 12.

Figure 4:
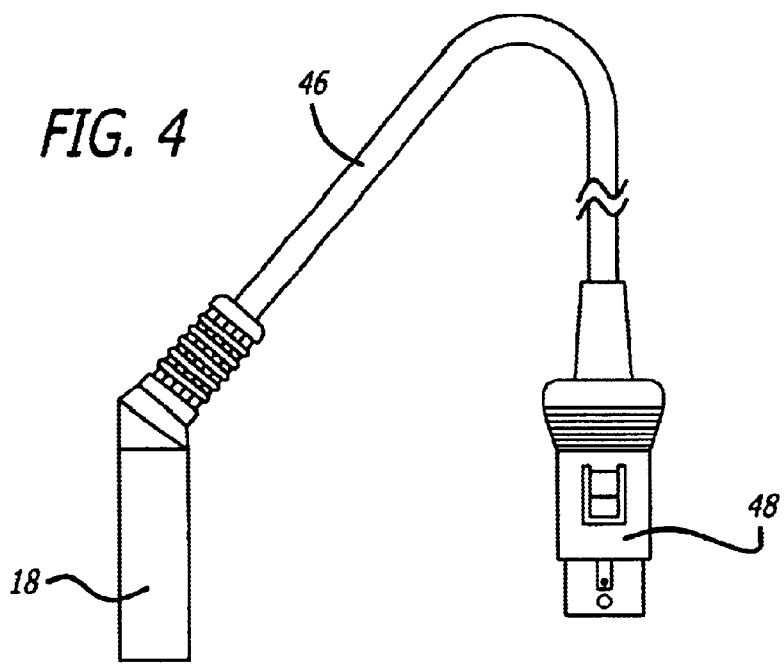
FIG. 4 is an alternative embodiment of a connector.
Figure 5:
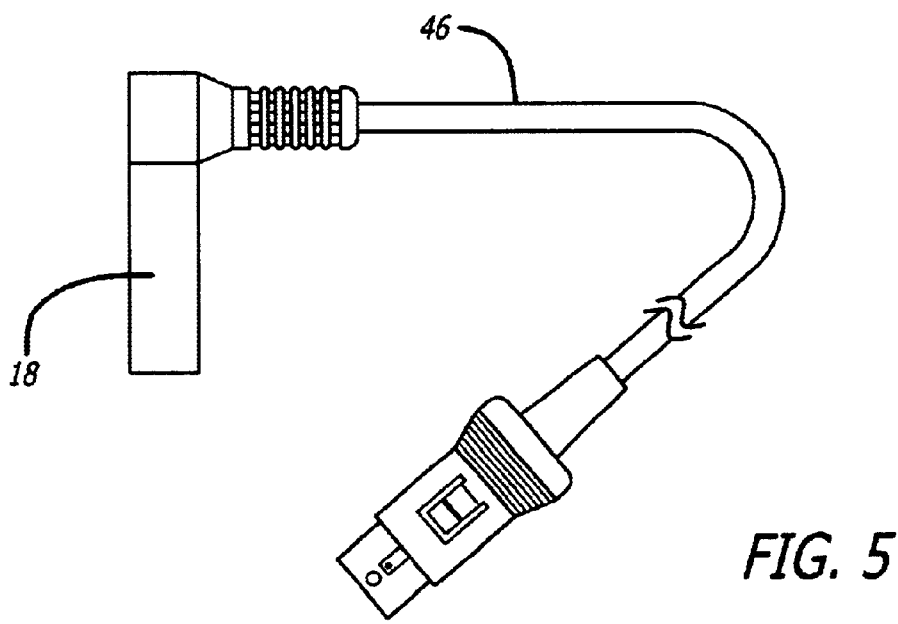
FIG. 5 is yet another alternative embodiment of a connector.

FIG. 4 illustrates by way of example an alternative way of coupling the cord 46 to the connector 18. In this embodiment, the cord 46 is coupled to the connector 18 at about a 45° angle so that it may be more comfortable for a user to hold the cartridge 10. Still further, as illustrated by way of example in FIG. 5, the core 46 may be coupled to the connector 18 at about a 90° angle to each other for application in which such relationship would aid the user in using the cartridge 10 more comfortably.

Figure 6A:
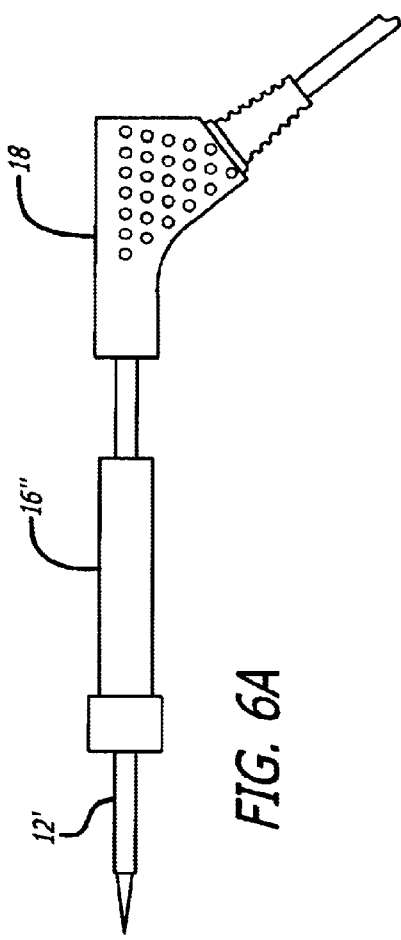
FIG. 6A is an exemplary view of an alternative embodiment of the present invention.
Figure 6B:
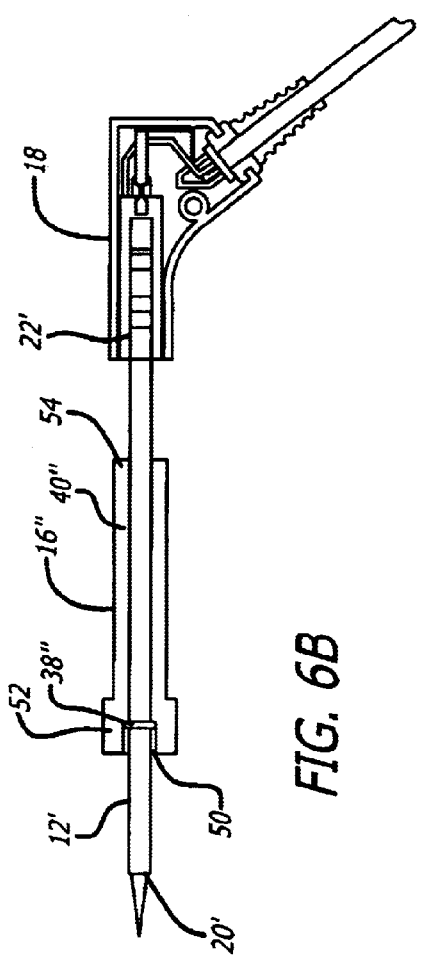
FIG. 6B is an exemplary cross-sectional view of the embodiment illustrated in FIG. 6A.

FIGS. 6A and 6B illustrate still another alternative embodiment of the present invention wherein the sleeve 12' is inserted into a hole 40" of a handle 16". In this embodiment, the sleeve 12' has a ring 38" at a predetermined position to act as a stopper along a longitudinal axis of the sleeve 12'. Moreover, the handle 16" is divided into two portions, a distal portion 52 and a proximal portion 54. The distal portion 52 has a bore 50 adapted to receive the ring 38". As such, as the distal end 22' of the sleeve 12' is inserted through the bore 50 of the distal portion 52, the ring 38" acts as a stopper to prevent the handle 16" from moving further toward the distal end 20' of the sleeve 12'. This ensures that the handle 16" is correctly positioned relative to the sleeve 12'. Moreover, the outer configuration of the proximal portion 54 may be sized for a particular user, as such, the outer configuration of the proximal portion 54 may be smaller than the outer configuration of the distal portion 52. Conversely, the outer configuration of the distal portion 52 may be greater than the proximal portion 54.

Figure 7:
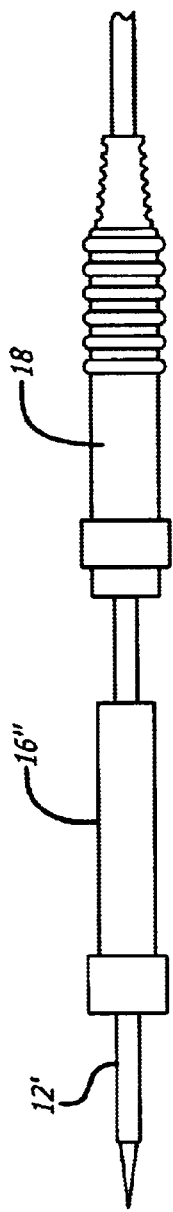
FIG. 7 is an exemplary view of a sleeve and handle illustrated in FIG. 6A coupled to a substantially similar connector illustrated in FIG. 1.

To assemble the cartridge illustrated in FIGS. 6A and 6B, a user first selects from a variety of handles which are most comfortable for the user. In other words, a user selects from a variety of handles having a different outer configuration along the proximal portion 54 designed for a particular user. Once a handle 16" has been selected, the proximal end 22' of the sleeve 12' is inserted through the bore 50 until the ring 38" stops the handle 16" in its predetermined position. Then, the proximal portion 22' is inserted into connector 18 until an electrical contact is made. This way, the cartridge illustrated in FIGS. 6A and 6B may be customized for a particular user. Moreover, in this embodiment, the sleeve 12' is coupled to the connector 18 having a core that is at about a 45° angle relative to the longitudinal axis of the sleeve 12'. Alternatively, as illustrated in FIG. 7, a connector 18 having a core that is substantially in line with the longitudinal axis of the sleeve 12' may be used as well.

In closing, it is noted that specific illustrative embodiments of the invention have been disclosed hereinabove. With respect to the claims, it is applicant's intention that the claims not be interpreted in accordance with the sixth paragraph of 35 U.S.C. § 112 unless the term "means" is used following by a functional statement.

What is claimed is:

1. A cartridge type soldering iron assembly, comprising:
 a sleeve having a proximal end and a distal end, the proximal end adapted to couple to a connector and the distal end adapted to couple to a tip; and
 a handle having an opening along the centerline of the handle adapted to receive the sleeve and associate with the sleeve at a predetermined position between the proximal and distal ends of the sleeve along a longitudinal axis of the sleeve.

2. A cartridge type soldering iron according to claim 1, where:
 the sleeve has a ring at the predetermined position along the longitudinal axis of the sleeve; and
 the handle having a proximal portion and a distal portion, where the distal portion has a bore adapted to receive the ring on the sleeve so that the ring acts as a stopper to associate the handle and the sleeve at the predetermined position.

3. A cartridge type soldering iron according to claim 1, where the proximal end of the sleeve is adapted to couple to a connector end having electrical contact surface areas.

4. A cartridge type soldering iron according to claim 1, where the connector has a receptacle opening having contact fingers adapted to electrically couple to the electrical contact surface areas of the connector end of the cartridge.

5. A cartridge type soldering iron according to claim 1, further including an electrical heating element within the sleeve and electrically coupled to the electrical contact surface areas of the connector end to convert electrical energy into heat, thereby providing heat to the tip.

6. A cartridge type soldering iron according to claim 1, where the handle is made of multi-layers.

7. A cartridge type soldering iron according to claim 1, where the handle is made of carbon impregnated foam material for static discharging.

8. A cartridge type soldering iron according to claim 1, where the handle is releasable from the sleeve.

9. A cartridge type soldering iron according to claim 1, where the cross-sectional area of the sleeve is cylindrical.

10. A cartridge type soldering iron according to claim 1, where the connector has a core that forms an acute angle relative to a longitudinal axis of the sleeve.

11. A cartridge type soldering iron according to claim 10, where the acute angle is about 45°.

12. A cartridge type soldering iron according to claim 1, where the connector has a core forming approximately 90° relative to a longitudinal axis of the sleeve.

13. A cartridge type soldering iron according to claim 1, including an insulator between the sleeve and the handle.

14. A system for replacing a handle in a soldering iron, comprising:
- a sleeve having a proximal end and a distal end along a longitudinal axis; and
- a handle having an opening along the centerline of the handle adapted to releasably associate with the sleeve at a predetermined position along the longitudinal axis of the sleeve between the proximal end and the distal end.

15. A system according to claim 14, where:
- the sleeve has a ring at the predetermined position along the longitudinal axis of the sleeve; and
- the handle having a proximal portion and a distal portion, where the distal portion has a bore adapted to receive the ring on the sleeve so that the ring acts as a stopper to associate the handle and the sleeve at the predetermined position.

16. A system according to claim 14, where the proximal end of the sleeve is adapted to couple to a connector end having electrical contact surface areas.

17. A system according to claim 16, where the connector has a core that forms an acute angle relative to a longitudinal axis of the sleeve.

18. A system according to claim 17, where the acute angle is about 45°.

19. A system according to claim 16, where the connector has a core forming approximately 90° relative to a longitudinal axis of the sleeve.

20. A system according to claim 14, including an insulator between the sleeve and the handle.

21. A method for replacing a handle from a cartridge type soldering iron to fit a particular user, comprising:
- picking a first handle having an opening alone the centerline of the first handle; and
- inserting a sleeve of a soldering iron having a proximal end and a distal end through the opening of the first handle, where the handle is releasably associated with the sleeve between the proximal end and the distal end of the sleeve.

22. A method according to claim 21, further including:
- connecting the proximal end of the sleeve to a connector to make electrical contact; and
- coupling a tip to the distal end of the sleeve.

23. A method according to claim 21, further comprising: removing an existing handle on the sleeve, if any.

24. A method according to claim 21, further comprising:
- removing the first handle;
- picking a second handle for a second user; and
- inserting the sleeve through an opening within the second handle so that the second handle is between the proximal and distal ends of the sleeve.

25. A method according to claim 21, further comprising: providing an insulator between the sleeve and the first handle.

26. A method according to claim 21, further comprising:
- inserting the proximal end of the sleeve through a bore formed within the first handle;
- stopping the first handle at a predetermined position along a longitudinal axis of the sleeve.

* * * * *